United States Patent [19]

Deville

[11] 4,041,545

[45] Aug. 9, 1977

[54] LIGHTNING CONDUCTOR IN A METALLIC CASING

[75] Inventor: Robert Deville, Lyon, France

[73] Assignee: Delle-Alsthom, Villeurbanne, France

[21] Appl. No.: 618,612

[22] Filed: Oct. 1, 1975

[30] Foreign Application Priority Data

Oct. 2, 1974 France ............................ 74.33188

[51] Int. Cl.[2] ............................................ H02H 9/06

[52] U.S. Cl. .................................... 361/120; 361/127

[58] Field of Search .................... 317/61, 61.5, 62, 71; 313/174, 182, 231.1; 361/120, 127

[56] References Cited

U.S. PATENT DOCUMENTS

| | | | |
|---|---|---|---|
| 706,741 | 8/1902 | Fessenden | 317/62 X |
| 3,777,218 | 12/1973 | Kessler | 317/62 X |
| 3,875,467 | 4/1975 | Riedel | 317/62 |
| 3,881,138 | 4/1975 | Luxa et al. | 317/71 X |
| 3,936,703 | 2/1976 | Sakshaug | 317/62 |

*Primary Examiner*—Harry E. Moose, Jr.

[57] ABSTRACT

The invention relates to a lightning conductor having a gaseous enclosure. The lightning conductor which comprises an enclosure filled with insulating gas and is arranged inside a metallic casing under dielectric fluid pressure containing a high-tension electrical device is characterized in that the said enclosure is provided with means for making the insulating gas flow. The invention is applied to the protection of high-tension electrical devices.

4 Claims, 1 Drawing Figure

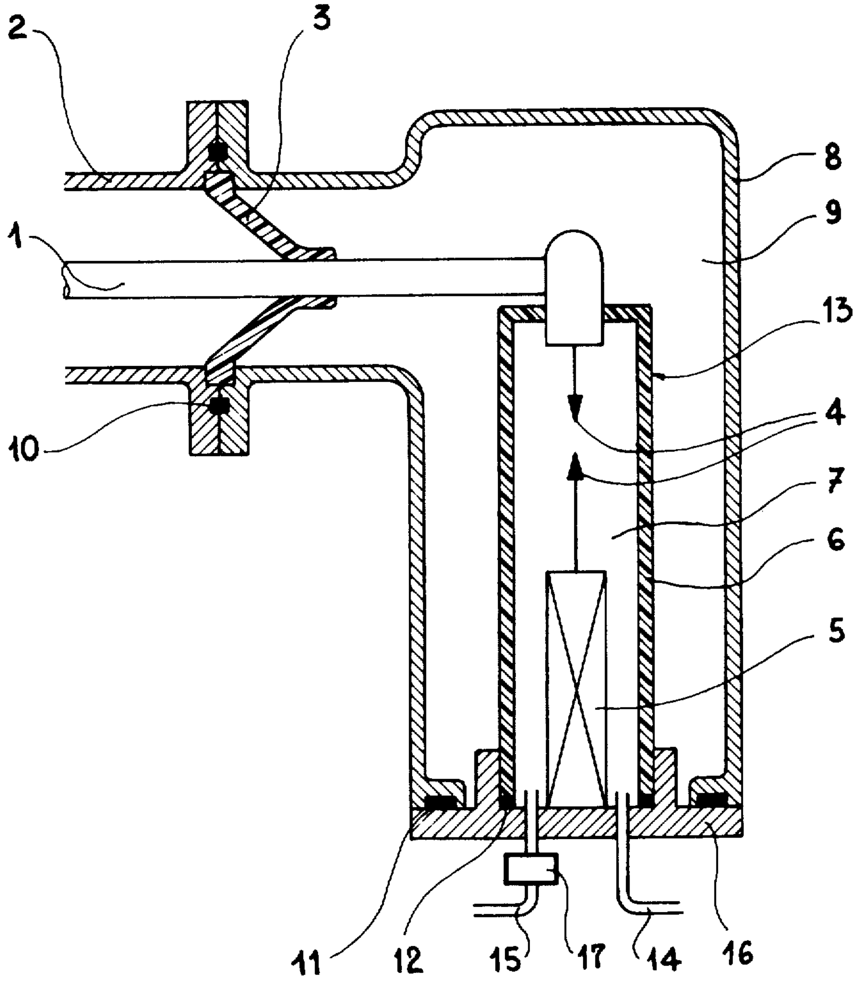
2
3
8
9
1
13
10
4
7
6
5
11
12
15
17
14
16

LIGHTNING CONDUCTOR IN A METALLIC CASING

The invention relates to a lightning conductor for the protection of high-tension electrical devices in a metallic casing.

Such a device is often insulated by a fluid having high dielectric rigidity such as sulphur hexafluoride, generally under pressure, or, exceptionally, compressed air. The integration of the lightning conductor protecting the equipment in that casing has several advantages. That arrangement makes it possible to reduce the distance between the lightning conductor and the equipment, this improving protection against over-voltages and it ensures the continuity of the metallic casing, avoiding any contact between the conductive parts under tension and the personnel. But the active parts of the lightning conductor are themselves frequently arranged in an insulating enclosure, containing a gas which is usually air or nitrogen under atmospheric pressure, or, even, very generally, under a pressure lower than the pressure of the fluid having high dielectric rigidity which separates the metallic casing from the insulating enclosure. Even with an insulating enclosure comprising good-quality fluid-tight sealing, the fluid having high dielectric rigidity of the metallic casing is diffused very slowly in the insulating enclosure and in a quantity which is all the greater as the difference in pressure is greater. When there is any penetration of sulphur hexafluoride in the enclosure of the lightning conductor, the dielectric rigidity increases with the pressure and the puncture voltage becomes greater than that of air and of nitrogen; the sparking voltage of the lightning conductor increases. The operational characteristics are modified and the result of this is that protection is no longer provided.

The invention relates to a lightning conductor whose operating characteristics are maintained when it is placed in a casing made of a substance insulated by a fluid under pressure.

The aim of the invention is a lightning conductor comprising an enclosure filled with insulating gas and arranged inside a metallic casing under dielectric fluid pressure containing a high-tension electrical device, characterized in that the said enclosure is provided with means for making the insulating gas flow.

According to one characteristic, the flow of the gas can be permanent.

According to another characteristic, the flow of the gas can be intermittent and comprise a means for inspecting and controlling the flow.

The characteristics and advantages of the invention will become apparent from the description thereof given by way of example and illustrated in the FIGURE.

The single FIGURE is a diagrammatic and partly cross-section view of an installation comprising a lightning conductor according to the invention.

In the FIGURE, the high-voltage electrical equipment has not been shown, for it does not form a part of the invention. The metallic casing under pressure of an electric fluid is constituted by an assembly of elements such as 2, 8 and 16.

The electrical equipment to be protected is connected by a conductor 1 to a lightning conductor 13. The conductor 1 is kept in the metallic casing by supports such as insulating cones 3.

The elements 8, 16 and the insulating cone 3 limit an inside space 9, filled with the dielectric fluid, for example sulphur hexafluoride and containing the lightning conductor 13.

The lightning conductor 13 comprises dischargers 4 and variable resistors 5 contained inside an insulating enclosure 6 closed by the element 16. The inside 7 of the enclosure 6 is filled with insulating gas, such as nitrogen or air under a pressure not normally exceeding the atmospheric pressure.

Fluid-tight sealing is provided, between the inside space 9 of the casing and the atmosphere by seals such as 10 and 11 and between the inside 7 of the enclosure 6 and the space 9, by seals such as 12. The insulating cones 3 can contingently provide a separation between the fluid contained in the space 9 and that of the remainder of the equipment. A pipe 14 connected to the outside makes it possible to remove the fluid which has been diffused from the inside space 9 and the over-pressures which can be generated in the inside 7 of the enclosure 6. The admission of the gas is thus effected through the pipe 14 and the exhaust is effected through the pipe 15.

That flow of gas can be permanent or intermittent. If the flow is intermittent, it can take place at regular intervals or, even, be controlled by a device detecting one or several characteristics of the gas within the enclosure 6 which has an influence of the sparking voltage of the lightning conductor, such as, for example, the increase in the dielectric rigidity of the gas, the presence of sulphur hexafluoride or the increase of the pressure in the enclosure 6. The flow gas can come from any source, such as a cylinder or a tank under high pressure fitted with pressure reducers.

As the dielectric characteristic of the internal parts of the lightning conductor requires a dry gas, any known type of drying device is generally used on the gas inlet into the enclosure and, in the majority of cases, a second drying device is used on the outlet into the atmosphere to avoid a return of humidity. It is also possible and preferable to effect a flow of the gas with a closed circuit comprising a device removing the sulphur hexafluoride and the residual humidity, which is very slight in a closed circuit and is caused, for example, by cooling and condenstion.

It is evident that the invention is in no way limited to the embodiment which has just been described and illustrated and which has been given only by way of an example; more particularly, without going beyond the scope of the invention, certain arrangements can be modified or certain means can be replaced by equivalent means.

I claim:

1. A lightning conductor comprising: a metallic casing filled with dielectric fluid under pressure; an enclosure arranged on the inside of said metallic casing and filled with insulating gas, said enclosure having inlet means for the flow of insulating gas from the exterior of said casing to the interior of said enclosure, said enclosure having outlet means for the flow of insulating gas from the exterior of said casing to the interior of said enclosure, said enclosure having outlet means for the flow of insulating gas from the interior of said enclosure to the exterior of said casing, the pressure within said enclosure being substantially lower than the pressure of the dielectric fluid in said metallic casing, said inlet means and outlet means inhibiting effects from rise of pressure within said enclosure due to penetration of dielectric fluid into said enclosure, said dielectric fluid being arranged to hold a high-tension electrical device in said casing.

2. Lightning conductor according to claim 1, wherein the flow of the gas is permanent.

3. Lightning conductor according to claim 1, wherein the flow of the gas is intermittent.

4. Lightning conductor according to claim 3, including a device for inspection of the gas in said enclosure and for controlling the flow of the gas.

* * * * *